June 1, 1926.

E. A. STEVENS 1,587,436

LINE AND SURFACE LEVEL

Filed Oct. 14, 1922

WITNESSES

Oliver W. Holmes
A. L. Ketchum

INVENTOR
Ernest A. Stevens
BY Munn & Co.
ATTORNEYS

Patented June 1, 1926.

1,587,436

UNITED STATES PATENT OFFICE.

ERNEST A. STEVENS, OF NEWTON FALLS, OHIO; ALVIN W. HART, ADMINISTRATOR OF SAID STEVENS, DECEASED, ASSIGNOR TO ERNEST A. STEVENS, JR., OF NEWTON FALLS, OHIO.

LINE AND SURFACE LEVEL.

Application filed October 14, 1922. Serial No. 594,618.

This invention relates to leveling devices and particularly to an improved level adapted for use as a line level or as a surface level and has for an object to provide an improved construction whereby when it is used on a line it is locked against accidental disengagement therefrom.

Another object of the invention is to provide a level which may be quickly applied to a line or removed therefrom while at the same time being locked to the line when in position thereon.

A further object of the invention is to provide a level which may be used as a line level and a surface level without any change or adjustment and when used as a surface level engage a given surface at spaced points in such a manner as to give true results.

In the accompanying drawing—

Figure 1:
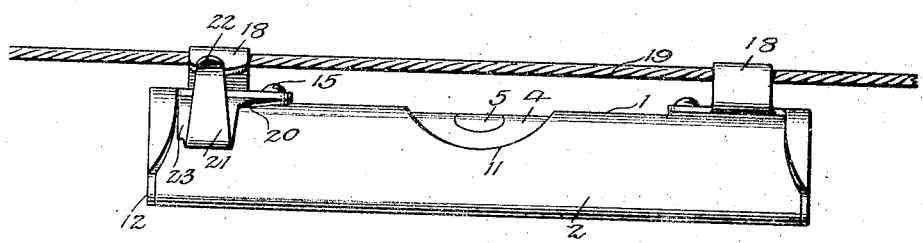
Figure 1 is a side view of a level disclosing an embodiment of the invention, the same being shown applied to a line.

Referring to the accompanying drawing by numerals, 1 indicates the body of a level which is provided with a casing 2, a filling 3 of wood or other material and a glass tube 4 provided with a filling of liquid and the usual bubble 5. The casing 2 is substantially A-shaped in cross section but rounded at the corners and provided with a bowed up section 6 on the bottom so that the level will rest upon the rounded edges 7 and 8. These edges are ground off or otherwise shaped to present flat longitudinal surfaces 9 and 10 which are parallel to the tube 4 so that when the level is resting on a surface it will be resting on these flat portions and will indicate correctly whether or not the surface is level. It will be noted that the casing 2 is cut away at 11 to expose an appreciable part of the tube 4 in order that the action of the bubble may be readily observed. A cap 12 is connected to the body 1 adjacent each end and as these caps are identical, the description of one will apply to both.

Figure 2:
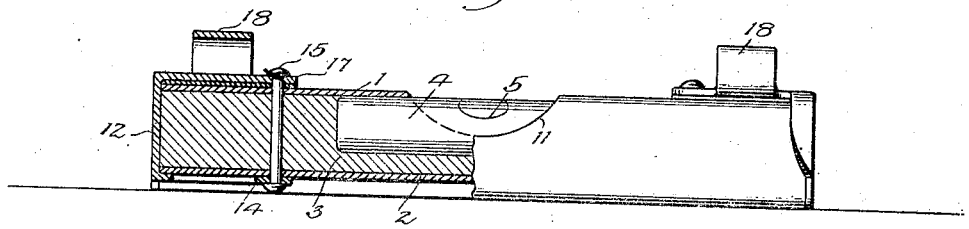
Figure 2 is a side view of the level shown in Figure 1 with certain parts broken away, said level being shown in connection with a surface.
Figure 3:
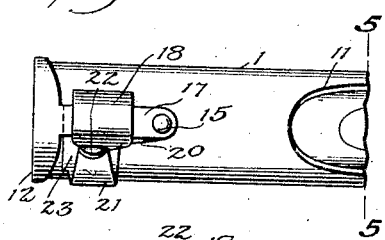
Figure 3 is a top plan view of one end of the level shown in Figure 2.
Figure 4:
Figure 4 is a bottom plan view of one end of the level shown in Figure 2.
Figure 5:
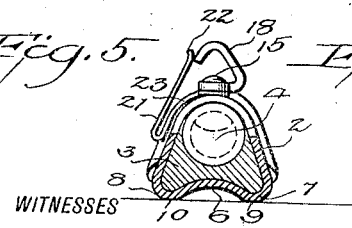
Figure 5 is a sectional view through Figure 3 approximately on line 5—5.
Figure 6:
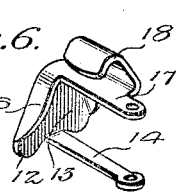
Figure 6 is a perspective view of an end cap and hook embodying certain features of the invention.
Figure 7:
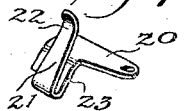
Figure 7 is a perspective view of a lock or spring clip embodying certain features of the invention.

The cap 12, as illustrated in Figure 6, is provided with an end section or body 13 having substantially the same shape as the end of the body 1 against which it rests when in position. The end section 13 is provided with a tongue 14 extending beneath the curved portion 6 to which it is secured by a suitable rivet 15. Also, the end section 13 is provided with an extending or upstanding flange 16 fitting over the upper part of the casing 2, said flange merging into a forwardly extending tongue 17, which tongue is bent into a hook 18 adapted to be passed over a cable 19 when the device is used for testing the level of the cable. The tongue 17 is riveted to the body 1 by the rivet 15 which not only passes through the tongue 14 but through the end of the tongue 17 as shown in Figure 2. This rivet also passes through the extension 20 of the lock or spring clip 21. The lock or spring clip 21 is provided with a tongue section 22 adapted to resiliently press against the hook 18 and the body section 23 merging into the extension 20, said body section 23 conforming substantially to the side of the casing 2 as illustrated in Figure 5.

When the device is used as a line level, it may be positioned so that the line will rest in the space between the tongue 22 and the hook 18 and then force upwardly until the tongue 22 moves aside and the cable or line allowed to move into respective hooks 18. The hooks 18 are arranged so that their inner surfaces may be parallel with the tube 4 and, consequently, if the bubble 5 is centrally located in the tube, the line will be level as indicated in respect to line 19 (Figure 1). The level may be easily removed from the cable by springing the tongues 22 to one side and disengaging the hooks from the line. However, the level cannot be accidentally disengaged or jarred off.

Whenever desired, the level may be used in connection with a flat surface as indicated in Figure 2 without adjusting any part. When used as a surface level the device will rest upon the prepared flat portions 9 and 10 which are parallel to the tube 4.

What I claim is:—

1. A level of the character described, comprising a casing, a glass tube carried by said casing filled with a liquid and provided with a bubble, a supporting hook arranged at each end of said casing, and a resilient locking member co-acting with each hook comprising a body formed with a rivet receiving aperture and an extension bent so as to conform to the curvature of said casing, said extension being formed with a resilient tongue having one end normally resting against said hook for closing the hook.

2. In a level of the character described, a body, an end member for each end of the body provided with a hook and a locking structure for said hook, said locking structure comprising a resilient tongue having a flaring end adapted to rest against said hook and close the opening of the hook, said tongue merging into a body section, and a projection, and a single member extending through said projection and part of the end member for securing them to said body.

3. A level, comprising a body formed of sheet metal substantially A-shape in cross section and provided with a longitudinal portion concaved inwardly along the center of the bottom whereby parallel longitudinal edges will be presented, a filling of comparatively resilient material positioned in said body, a glass tube provided with a liquid having a bubble arranged in the body and embedded partially in said filler, and means carried by the body for suspending the body on a wire parallel thereto.

4. A level, comprising a body formed with a centrally positioned notch, a tube provided with a liquid and a bubble, said tube being positioned in the body so that the central part will be seen through said notch, a filling arranged in said body for holding said tube in place, a pair of removable end members mounted on said body, each of said end members having overlapping flanges for overlapping part of the body, said flanges including a top and bottom strap extending an appreciable distance from the ends, each of said straps having an aperture near the end, a rivet near each end of the body extending through said apertures for securing said ends to the body, each of said ends being formed with an extension bent into a hook, and a resilient tongue normally bearing against each of said hooks for closing the same, each of said tongues having an apertured projection positioned so that said rivets will extend through the respective tongues for clamping the same in place.

5. A level including a body portion and a pair of end cap members, said members each comprising a flat vertical section having inwardly projecting side flanges and apertured tongues extending longitudinally of the body portion from the upper and lower edges of said flat section, a hook bent upwardly from the aforesaid upper tongue, and a hook closing member comprising a body portion having an apertured longitudinally extending tongue and a laterally disposed resilient tongue normally in engagement with said hook to close the same, the apertures of the last mentioned tongue, and of the upper and lower tongues adapted to receive common cap holding means.

ERNEST A. STEVENS.